March 8, 1966 A. J. WHITE 3,238,626
REVERSIBLE GAGE SETTING APPARATUS
Filed Aug. 29, 1963 2 Sheets-Sheet 1
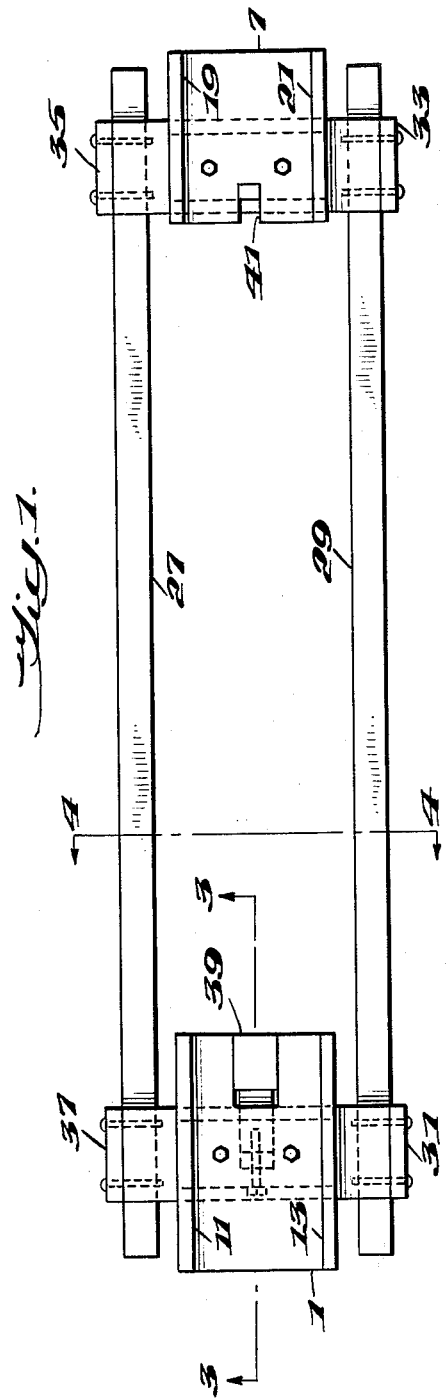
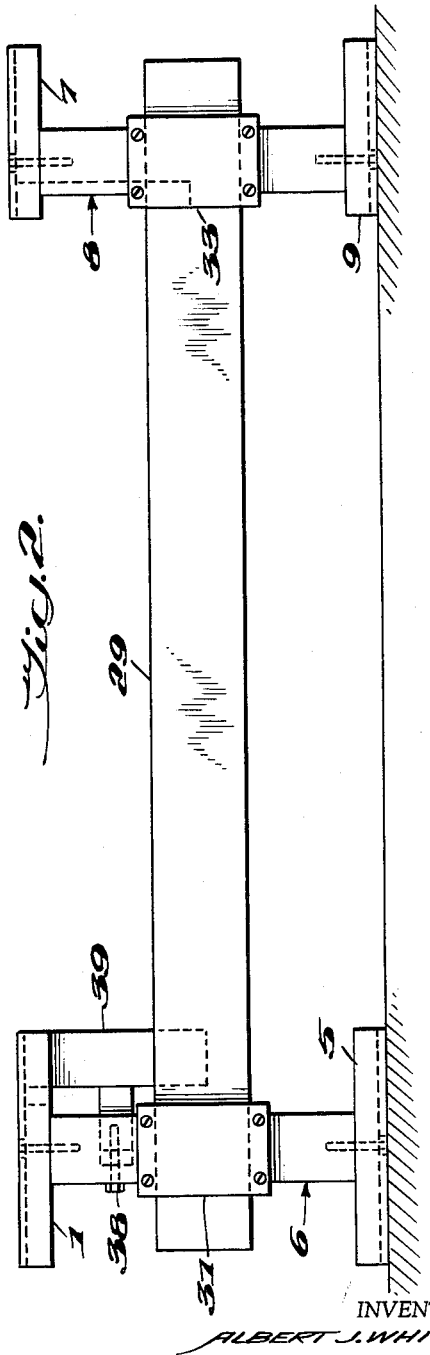
INVENTOR
ALBERT J. WHITE,

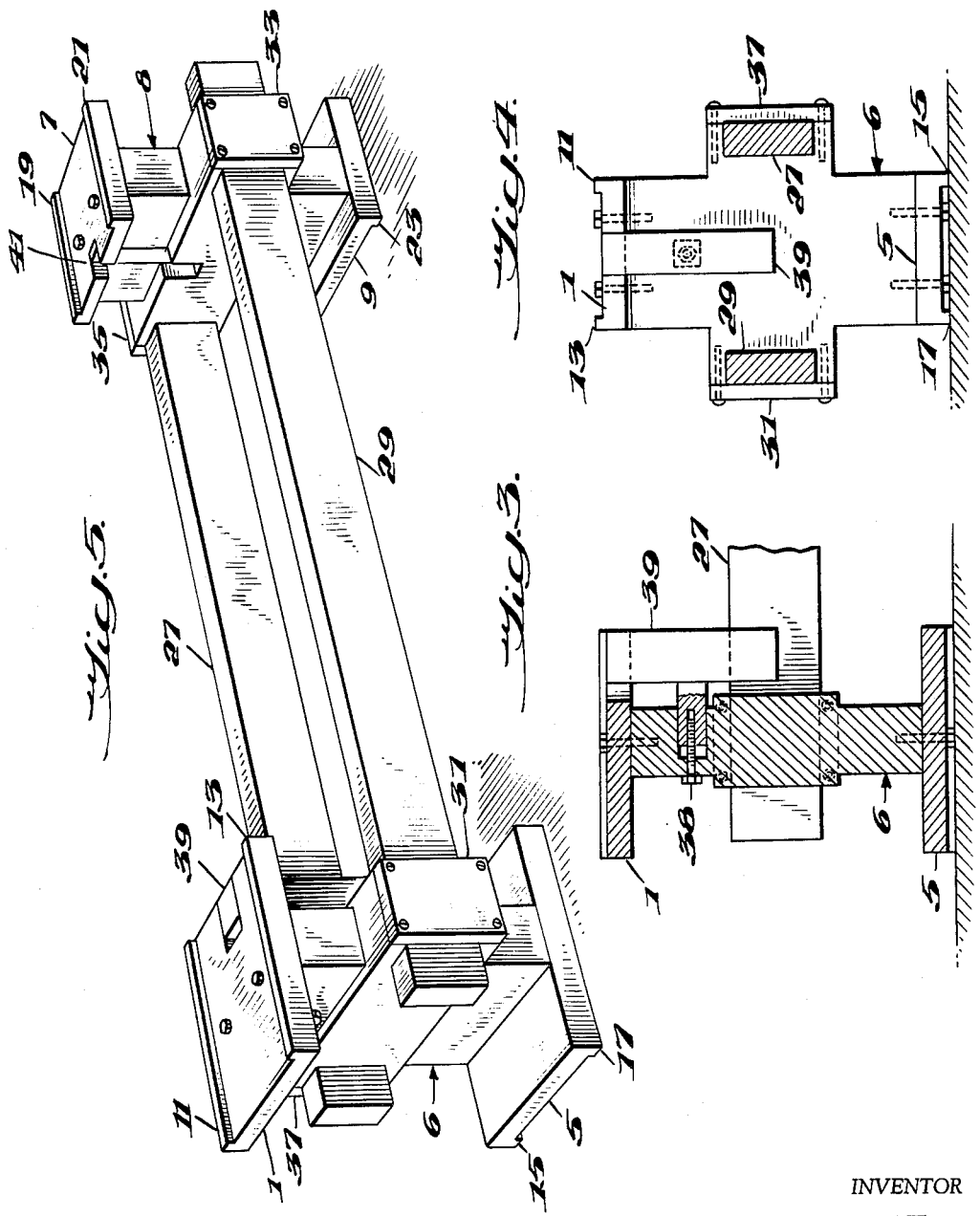

United States Patent Office 3,238,626
Patented Mar. 8, 1966

3,238,626
REVERSIBLE GAGE SETTING APPARATUS
Albert J. White, Kingston, N.Y., assignor, by mesne assignments, to B. C. Ames Co., Waltham, Mass., a corporation of Massachusetts
Filed Aug. 29, 1963, Ser. No. 305,345
5 Claims. (Cl. 33—143)

This invention relates to a gage setting apparatus and more particularly to a gage setting apparatus or setmaster having a reversible feature enabling the depth capacity to be doubled.

The present device is used to calibrate gages for measuring the inside and outside dimensions of objects. It has particular application for internal or external diameter gages. Internal diameter gages are generally carried by a supporting structure which rests on the top surface of the hole whose diameter is to be measured. The gage mechanism is carried beneath the supporting structure at the depth at which the desired internal or external diameter is to be measured. The gage depth at which the desired internal diameter is to be measured is adjustable, and this dimension is set prior to calibrating the gage against a known measurement in a gage setting apparatus.

A conventional gage setting apparatus comprises a pair of end block assemblies movable along a rail or track in adjustable fashion to provide for setting known distances therebetween. One end block assembly customarily carries an adjustable anvil device for fine adjustments of the spacing when setting this distance with precision gaging blocks, etc. Since the gage to be calibrated must rest on the gaging apparatus in the same fashion that it is to rest upon the surface of the object whose internal dimensions are to be measured, it will be appreciated that the height of the gage setting apparatus must be at least equal to the maximum depth at which an internal measurement is to be taken. In the conventional single rail gaging apparatus this requirement results in a high end block assembly causing the gaging apparatus to be topheavy. Also, the height of the rail member is dead space as far as useful depth measurement is concerned.

In the past the depth limitations of these gage setting apparatuses have been overcome by employing vertically adjustable end block assemblies to accommodate for gages of greater depth capacity. Vertically adjustable devices such as this usually have set-screw arrangements which eventually distort under the stress of constant use and cause parts to shift. When a set-screw arrangement is replaced with a more positive locking method, the resulting structure requires considerably more time in setup operation. Since any adjustable device is inherently less accurate than a fixed construction, it is desirable to eliminate as many adjustments as possible in a precision mechanism.

Accordingly, it is an object of this invention to provide a gage setting apparatus having a minimum number of movable parts for adjustment.

Another object of the invention is to provide a gage setting apparatus having an increased depth capacity to accommodate gages for measuring internal or external diameters at greater depth.

A further object of the present invention is to provide a gage setting apparatus having an increased depth capacity adapted to accommodate gages for measuring either internal or external diameters.

Still another object of the invention is to provide a gage setting apparatus in which all movable parts of the apparatus are self-aligning in parallel relationship to insure increased accuracy.

Another and still further object of the invention is the provision of a gage setting apparatus having positive means for securing in position on the apparatus the gage to be calibrated.

These features and objects are realized in a device comprising a pair of end block assemblies slidably mounted on a pair of rail members which are spaced apart sufficiently to accommodate a gage to be calibrated to extend therebetween. An adjustable anvil mechanism is mounted in one of the end block assemblies, and this anvil is dimensioned to have a height equal to one-half of the maximum depth to be accommodated by the gage setting apparatus. The end block assembly carrying the adjustable anvil is constructed so that it may be inverted to vary the vertical displacement of the anvil member from the top surface of the apparatus in a manner to be explained in more detail subsequently. This feature doubles the depth capacity of the gage setting apparatus of the invention. Further, the end block assemblies may be reversed in accordance with whether an internal or external diameter gage is to be calibrated. The rail members are removable so that different lengths may be utilized, and the rails are positively locked in position by end plates in self-aligning fashion.

The foregoing and other objects, features and advantages of the invention will be apparent from the following more particular description of a preferred embodiment of the invention, as illustrated in the accompanying drawings, in which:

FIG. 1 is a plan view of a gage setting apparatus embodying the features of the present invention;

FIG. 2 is a front elevation of the device shown in FIG. 1;

FIG. 3 is a cross-sectional view taken along lines 3—3 of FIG. 1;

FIG. 4 is a cross-sectional view taken along lines 4—4 of FIG. 1; and

FIG. 5 is a perspective view of the device shown in FIGS. 1–4.

The operation of the invention will now be described with reference to the drawings which depict various views of a single embodiment of the invention. The gage setting apparatus comprises four rest plate members 1, 5, 7 and 9 mounted on end blocks 6 and 8. Rest plate 1 has upturned retaining edge portions 11 and 13. Similarly rest plates 5, 7 and 9 have upturned retaining edge portions 15 and 17, 19 and 21, and 23 and 25, respectively.

A pair of rail members 27 and 29 are slidably mounted in side recesses of end blocks 6 and 8. These rail members 27 and 29 are clamped in self-aligning position against movement by means of end plate members 31, 33, 35 and 37. These end plate members may be secured by means of suitable machine screws as shown.

End block member 6 has an adjustable anvil 39 mounted therein for adjustment by means of screw 38. End block member 8 has a vertical slot 41 extending throughout its height in opposed relationship to adjustable anvil 39.

In operation the distance between the face of the adjustable anvil 39 and the back of slot 41 is adjusted roughly by loosening end plates 31, 33, 35 and 37 to permit an approximate adjustment by sliding the end blocks 6 and 8 along the rail members 27 and 29. A fine adjustment of distance is made by adjusting screw 38 to move the adjustable anvil 39 to the desired setting, which may be obtained from precision gage blocks or other known standards.

The gage to be calibrated is positioned so that its supporting structure rests upon rest plates 1 and 7 and the gaging mechanism hangs below between the adjustable anvil 39 and slot 41. Slot 41 serves to restrict the movement of the gage and insure that an accurate calibration is performed. While the illustrated embodiment is directed to the calibration of internal diameter gages, by reversing end blocks 6 and 8 such that adjustable anvil 39 and slot 41 are on the exterior surface of the blocks, it is possible to convert the apparatus for calibration of external diameter gages.

In a typical gage setting apparatus the total height of the end block assemblies including the end blocks 6 and 8 and rest plates attached thereto might be 5 inches. In this instance the adjustable anvil 39 would be one-half of this dimension or 2.5 inches. The problem encountered in conventional gage setting apparatuses is one of providing a mechanism capable of accommodating the calibration of internal diameter gages over a wide depth range. With an adjustable anvil of 2.5 inches and an end block assembly 5 inches in height, the present device would be able to accommodate gages having a depth of anywhere from zero to 5 inches.

As the device is shown in the drawings, an internal diameter gage having a depth setting of anything in the range from 0 to 2.5 inches may be calibrated without further action. If it is desired to calibrate an internal diameter gage having a depth greater than 2.5 inches, but less than 5 inches, this can be accomplished by turning over the entire setmaster assembly so that rest plates 1 and 7 are on the bottom and rest plates 5 and 9 are on top, thus inverting the position of anvil member 39. Therefore, when a gage is placed on rest plates 5 and 9 the depending portion of the gage measuring mechanism will be located at a distance between 2.5 and 5 inches below the rest plate surfaces. Since the position of anvil 39 has been inverted, the anvil is now in position to serve as a calibrating surface over this extended range.

All surfaces and edges of the device are machined to be square and parallel so that the device is self-aligning and maintains the desired accuracy at all times. The upturned retaining edge portions of the rest plates serve to hold the gages in position for calibration and also serve as "feet" thereby doing away with the need for commercial jig feet or commercial tap screws for resting thereon. Since the end block members are removable from the rails, different length rails may be interchanged to provide longer or shorter diameter capacities within a single gage setting apparatus.

While the invention has been shown and described with particular reference to a preferred embodiment, it will be understood by those skilled in the art that various changes in form and details may be made without departing from the spirit and scope of the invention.

What is claimed is:

1. A gage setting apparatus for calibrating gages comprising a pair of rail members, a pair of end block members slidably mounted between said rail members, means for securing said end block members against movement along said rail members, rest plate members mounted on upper and lower face portions of each of said end block members, and an adjustable anvil member mounted in one of said end block members for movement parallel to said rail members, whereby a precise measurement can be set between said anvil member and the other end block member, said gage setting apparatus being reversible to invert the position of said anvil and thereby increase the depth capacity of said gage setting apparatus.

2. The combination according to claim 1 in which the height of said adjustable anvil member is one-half of the height of said end block members and said rest plate members whereby the depth capacity of said gage setting apparatus is doubled by inverting said gage setting apparatus including said anvil.

3. The combination according to claim 1 wherein said rest plate members are provided with upturned retaining edges which serve to hold a gage in position on the apparatus and as supporting feet to provide the desired positioning of the apparatus.

4. The combination according to claim 1 wherein one of said end blocks is provided with a slot to receive one end of a gage to be calibrated and restrict its movement during the calibration process.

5. A gage setting apparatus for calibrating gages comprising a pair of rail members, a pair of end block members slidably mounted between said rail members, end plate members mounted on said end blocks for securing said end blocks against movement and aligning said rail members in parallel relationship, rest plate members mounted on opposite ends of each of said end block members, said rest plates having opposed pairs of upturned retaining edges, an anvil member mounted in one of said end block members for movement parallel to said rail members, a slot in the other of said end block members in opposed relation to said anvil to restrict the movement of and align a gage to be calibrated, and means to adjust the spacing of said anvil from said slot, whereby a precise measurement can be set between said anvil member and said slot, said gage setting apparatus being reversible to invert the position of said anvil and thereby increase the depth capacity of said gage setting apparatus.

References Cited by the Examiner

UNITED STATES PATENTS

| 2,350,394 | 6/1944 | Ellstrom | 33—168 |
| 2,893,128 | 7/1959 | Carlson et al. | 33—143 |
| 2,911,725 | 11/1959 | Sleigh | 33—143 |

FOREIGN PATENTS 779,246  7/1957  Great Britain.

LOUIS R. PRINCE, *Primary Examiner.*

ISAAC LISANN, *Examiner.*